(12) United States Patent
Tojo

(10) Patent No.: US 7,071,974 B2
(45) Date of Patent: Jul. 4, 2006

(54) IMAGE PROCESSING APPARATUS

(75) Inventor: Hiroshi Tojo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 732 days.

(21) Appl. No.: 10/195,403

(22) Filed: Jul. 16, 2002

(65) Prior Publication Data

US 2003/0016291 A1 Jan. 23, 2003

(30) Foreign Application Priority Data

Jul. 18, 2001 (JP) ............................. 2001-217749

(51) Int. Cl.
*H04N 5/228* (2006.01)

(52) U.S. Cl. ............................. 348/222.1; 348/231.99

(58) Field of Classification Search .............. 348/222.1
See application file for complete search history.

(56) References Cited

U.S. PATENT DOCUMENTS

| | | | |
|---|---|---|---|
| 5,485,611 A * | 1/1996 | Astle ............................. 707/1 |
| 5,576,950 A * | 11/1996 | Tonomura et al. .......... 386/121 |
| 5,581,362 A | 12/1996 | Sakaue et al. |
| 6,298,145 B1 * | 10/2001 | Zhang et al. ............... 382/103 |
| 6,625,383 B1 * | 9/2003 | Wakimoto et al. ............ 386/46 |
| 6,647,157 B1 | 11/2003 | Shiiyama et al. |
| 6,711,587 B1 * | 3/2004 | Dufaux .................... 707/104.1 |
| 6,731,789 B1 | 5/2004 | Tojo |
| 2003/0086021 A1 | 5/2003 | Tojo |

FOREIGN PATENT DOCUMENTS

| | | |
|---|---|---|
| EP | 0 597 450 A2 | 5/1994 |
| EP | 0 642 268 A2 | 3/1995 |
| EP | 0 666 687 A2 | 8/1995 |
| JP | 7-99605 | 4/1995 |
| JP | 10-224736 | 8/1998 |

OTHER PUBLICATIONS

Koprinska, I., et al. "Temporal Video Segmentation: A Survey," Signal Processing:Image Communication, Elsevier Science Publishers, Amsterdam, NL, vol. 16, No. 5, Jan. 2001, pp. 477-500.

* cited by examiner

*Primary Examiner*—Tuan Ho
*Assistant Examiner*—James M. Hannett
(74) *Attorney, Agent, or Firm*—Fitzpatrick, Cella, Harper & Scinto

(57) ABSTRACT

An image processing apparatus obtains moving image data picked up by an image pickup unit and operation information concerning an operation condition of the image pickup unit as a time when the moving image data is picked up, and detects a predetermined operation on the basis of the obtained operation information. Then, if a time interval between the two successive predetermined operations is longer than a predetermined period, the image processing apparatus extracts image data of a frame corresponding to the former detected predetermined operation as an index.

18 Claims, 11 Drawing Sheets

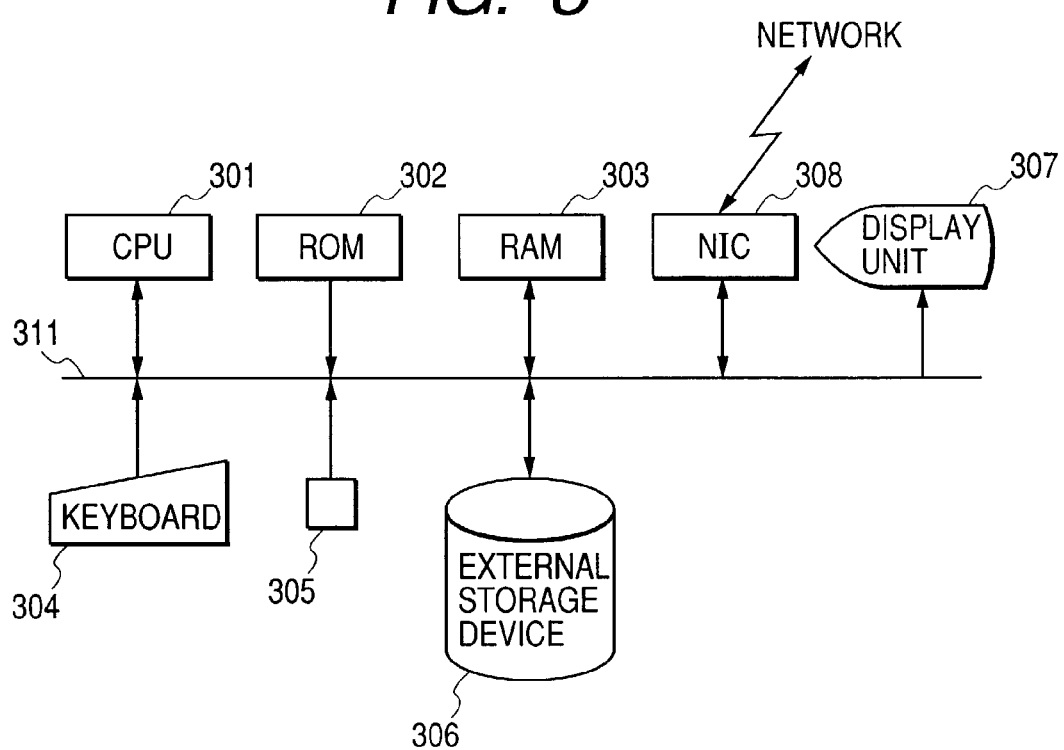
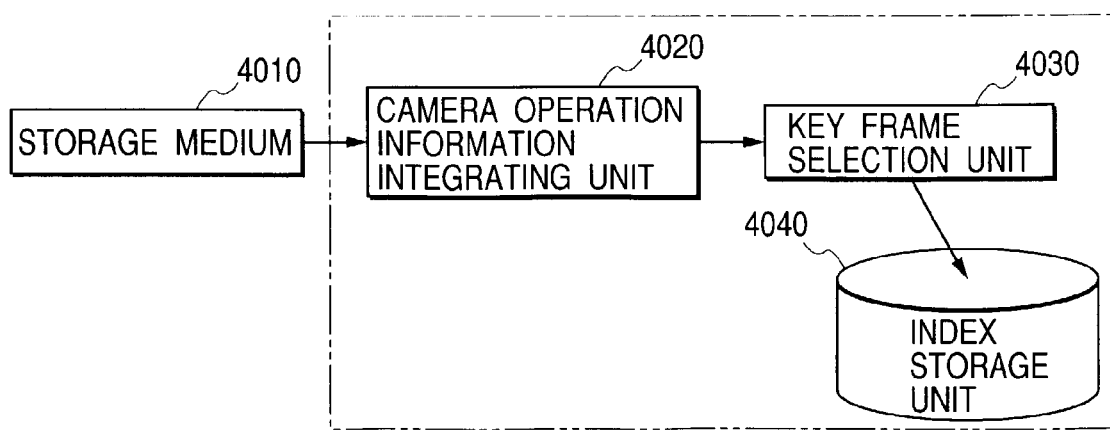

FIG. 6

WHITE BALANCE MODE

| BINARY CODE | WHITE BALANCE MODE |
|---|---|
| 000 | AUTO |
| 001 | HOLD |
| 010 | ONE PUSH |
| 011 | PRESET |
| 111 | NO INFORMATION |

FOCUS MODE

| BINARY CODE | FOCUS MODE |
|---|---|
| 0 | AUTO |
| 1 | MANUAL |

FOCAL LENGTH $M \times 10^L$ [cm]

M : INTEGER OF FIVE BITS
L : INTEGER OF TWO BITS

FIG. 7

ZOOM (FOR EACH FRAME)

| BINARY CODE | ZOOM BUTTON |
|---|---|
| 0 | OFF |
| 1 | ON |

| BINARY CODE | DIRECTION OF ZOOM |
|---|---|
| 0 | ZOOM-IN |
| 1 | ZOOM-OUT |

| BINARY CODE | STRENGTH OF ZOOM |
|---|---|
| 000000 | LEVEL 0 |
| 000001 | LEVEL 1 |
| 000010 | LEVEL 2 |
| 000011 | LEVEL 3 |
| 000100 | LEVEL 4 |
| FOLLOWING CODES | UNDEFINED |

PAN (FOR EACH FRAME)

| BINARY CODE | PAN |
|---|---|
| 0 | WITHOUT PAN |
| 1 | WITH PAN |

| BINARY CODE | DIRECTION OF PANNING |
|---|---|
| 0 | PAN TO LEFT SIDE |
| 1 | PAN TO RIGHT SIDE |

| BINARY CODE | STRENGTH OF PAN |
|---|---|
| 000000 | LEVEL 0 |
| 000001 | LEVEL 1 |
| 000010 | LEVEL 2 |
| 000011 | LEVEL 3 |
| 000100 | LEVEL 4 |
| FOLLOWING CODES | UNDEFINED |

| SHOT ID | TIME CODE | THUMBNAIL |
|---|---|---|
| 1 | TIME CODE 1 | THUMBNAIL 1 |
| 1 | TIME CODE 2 | THUMBNAIL 2 |
| 2 | TIME CODE 3 | THUMBNAIL 3 |
| 2 | TIME CODE 4 | THUMBNAIL 4 |
| 2 | TIME CODE 5 | THUMBNAIL 5 |
| 3 | TIME CODE 6 | THUMBNAIL 6 |

IMAGE PROCESSING APPARATUS

BACKGROUND OF THE INVENTION

1. Field of the Invention

The present invention relates to an image processing apparatus, and more particularly, to an image processing apparatus which extracts, as a representative image, a frame from a moving image and sets it as an index.

2. Related Background Art

Conventionally, as a method of forming an index image to perform browsing and retrieval of moving images, there is the method in which one frame in the moving image is extracted and set as a representative image (called a "key frame" hereinafter), and this representative image is used as the index image together with the position thereof in the moving image.

The moving image can be divided into plural units each called a "shot". The shot corresponds to a period from a photographing start to a photographing end in case of that the moving image is picked up by a video camera, and corresponds to a period (one scene) until a camera angle or the like is switched over in a case where the moving image is of television broadcasting. Thus, the method of detecting the switchover of the shot and setting the headmost frame of each shot as the index image is well known.

However, in fact, if two or more events are picked up because the camera is panned during one shot, in order to grasp the contents of this shot, it is insufficient to set only the headmost frame as the key frame. Moreover, for example, in a case where a zoom-in operation starts from the head of the shot and then continues until the end of the shot to zoom in on an object of interest, the frame after the zoom-in operation might be more suitable than the headmost frame as the key frame for the entire shot.

As a conventional technique for solving such problem, there is a method of extracting the frame after the zoom-in operation as the key frame by using camera operation information.

As an example of this method, Japanese Patent Application Laid-Open No. 7-99605 (corresponding to U.S. Pat. No. 5,581,362) discloses the technique that, when an image is picked up, the camera operation information is multiplexed or combined with video information and stored in a storage medium, and then, when the stored video information is reproduced, the frame satisfying a specific condition, e.g., after the zoom-in operation, is set as the key frame. Moreover, Japanese Patent Application Laid-Open No. 10-224736 discloses the technique that camera operation information is discriminated in an image process, and also the frame satisfying a specific condition, e.g., after the zoom-in operation, is set as the key frame.

Particularly, when an ordinary user picks up an image by using a video camera or the like, a smooth operation is frequently difficult for this user because the user is inexperienced in the camera's operation. For example, in a case of performing the zoom-in operation, the user has to repeat the zoom-in operations many times until the target image is enlarged to the desired size, and moreover has to perform a zoom-out operation also. This is because, since it is difficult to stop the zoom-in operation just in the desired size, the user has to correct the excessively zoomed-out image.

Here, such zoom-in and zoom-out operations should be originally considered as a series of operations. However, in Japanese Patent Application Laid-Open No. 7-99605, the end of the operation is detected in a case where, after operation information continuously increases or decreases for a certain number of frames or more, this information is continuously maintained without change for a certain number of frames.

For this reason, since such an operation as repeatedly increasing and decreasing the operation amount, e.g., repeatedly zooming in and out the images, cannot be considered as a series of operations, there is a problem that a number of similar images and meaningless images are extracted as key frames.

Moreover, if a user erroneously handles a zoom button and thus returns an operation state to its former state, where this operation is not intended by the user, then if the key frame is extracted, this frame merely represents a meaningless image.

However, in Japanese Patent Applications Laid-Open Nos. 7-99605 and 10-224736, there is a problem that the key frame is extracted in such instances of operations not intended by the user, or erroneous operation as above is performed.

SUMMARY OF THE INVENTION

An object of the present invention is to solve such problems as above.

Another object of the present invention is to form an index image which is useful for a user.

Still another object of the present invention is to form an optimum index image for an image which is photographed when an camera operation is not smooth.

Under these objects, according to an aspect of the present invention, there is provided an image processing apparatus comprising:

an obtaining means for obtaining moving image data picked up by image pickup means and operation information concerning an operation condition of the image pickup means at a time when the moving image data is picked up;

a detection means for detecting a predetermined operation on the basis of the operation information obtained by the obtaining means;

a discrimination means for discriminating that a time interval between the two successive predetermined operations detected by the detection means is longer than a predetermined period; and an extraction means for extracting image data of one picture image from the moving image data on the basis of the discriminated result of the discrimination means.

BRIEF DESCRIPTION OF THE DRAWINGS

FIG. 3 is a block diagram showing the control structure of an indexing unit according to the first embodiment;

FIG. 4 is a block diagram showing the functional structure of the indexing unit according to the first embodiment;

FIG. 6 is a diagram showing an example of a camera operation information format in a DV format;

FIG. 7 is a diagram showing an example of the camera operation information format;

DETAILED DESCRIPTION OF THE PREFERRED EMBODIMENTS

Hereinafter, the preferred embodiments of the present invention will be explained in detail with reference to the attached drawings.

Figure 1:
FIG. 1 is a block diagram showing the system structure of a moving image index forming system according to the first embodiment.

FIG. 1 is a block diagram showing the structure of an image processing apparatus according to the first embodiment of the present invention. In FIG. 1, numeral 1010 denotes a photographing unit which photographs a moving image, numeral 1020 denotes a recording medium which records therein the moving image photographed by the photographing unit 1010, and numeral 1030 denotes an indexing unit which extracts a key frame from image data recorded in the recording medium 1020 and thus forms an index image.

Figure 2:
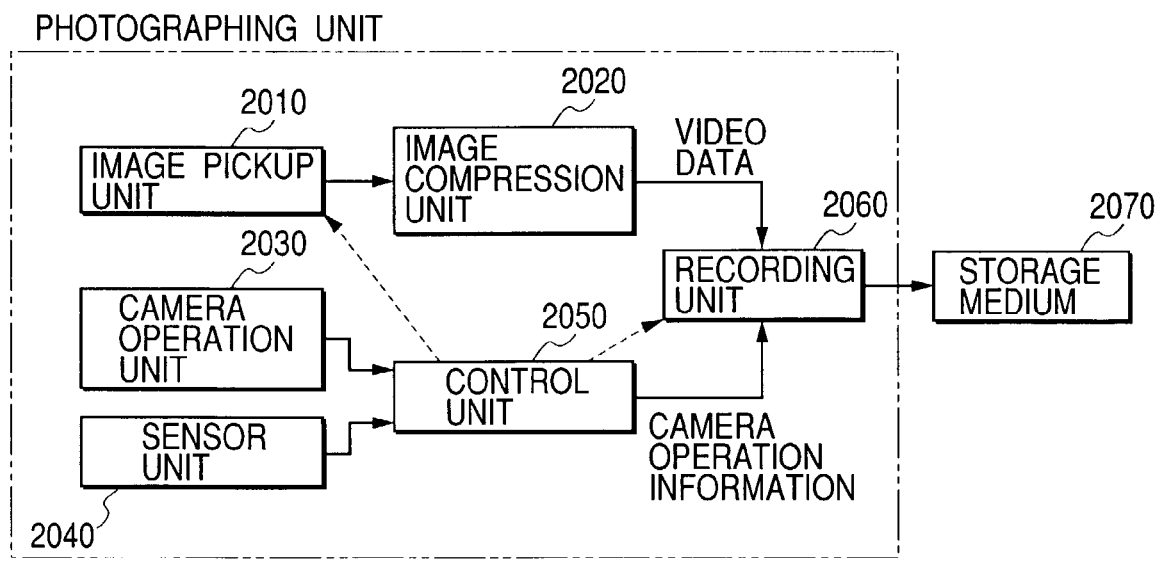
FIG. 2 is a block diagram showing the functional structure of a photographing unit according to the first embodiment.

FIG. 2 is a block diagram showing the structure of the photographing unit 1010 according to the first embodiment.

In FIG. 2, numeral 2010 denotes an image pickup unit which is composed of a lens, image pickup elements, an A/D converter and the like. Numeral 2020 denotes an image compression unit which performs a compression encoding process on a video signal from the image pickup unit 2010 by using an image compression circuit, on the basis of an algorithm of a predetermined compression system. For example, as an encoding system used in the compression encoding process, there are the system using orthogonal transformation and variable length encoding, and the system using motion compensation prediction such as MPEG-1, MPEG-2 or the like.

Numeral 2030 denotes a camera operation unit which is composed of a photographing start button, a zoom button and the like and inputs various camera operations by a user, numeral 2040 denotes a sensor unit which is composed of various sensors to detect the state of a camera and obtains various information representing opening of the diaphragm, focal length and the like, numeral 2050 denotes a control unit which controls the operation of the image pickup unit 2010 on the basis of operation information obtained from the camera operation unit 2030 and sensor information obtained from the sensor unit 2040, and numeral 2060 denotes a recording unit which multiplexes video data of the image compression unit 2020 with camera operation information (i.e., the user's operation information and the sensor information) at predetermined timing and records the multiplexed data on a storage medium 2070. Here, storage medium 2070 stores thereon the multiplexed video data and camera operation information, and is composed of a magnetic tape, a magnetooptical disk, a hard disk or the like.

FIG. 3 is a block diagram showing the control structure of the indexing unit 1030 according to the first embodiment.

In FIG. 3, numeral 301 denotes a CPU which executes various control in the indexing unit 1030 of the present embodiment, numeral 302 denotes a ROM which stores boot programs to be executed when the image processing apparatus starts and various data, and numeral 303 denotes a RAM which stores control programs for the process of the CPU 301 and also provides a working area when the CPU 301 executes the various control. Numerals 304 and 305 respectively denote a keyboard and a mouse which present various input operation circumstances by the user.

Numeral 306 denotes an external storage device which is composed of a hard disk, a flexible disk, a CD-ROM and the like, numeral 307 denotes a display unit which is composed of display and the like and displays operation results and the like to the user, numeral 308 denotes a network interface circuit (NIC) which enables communication with various devices on a network, and numeral 311 denotes a bus which connects these devices with others.

FIG. 4 is a block diagram showing the functional structure of the indexing unit 1030 according to the first embodiment.

In FIG. 4, numeral 4020 denotes a camera operation information integrating unit which reads out the video data and the camera operation information from a storage medium 4010 and performs an integrating process on the operation information on the basis of time information or the like. That is, with respect to the camera operation information representing the same operation content, an accumulated value of operation amounts represented by the time-adjacent camera operation information is calculated. Numeral 4030 denotes a key frame selection unit which extracts as the key frame the frame satisfying a predetermined condition on the basis of the camera operation information (i.e., the accumulated value of the operation amounts) integrated by the camera operation information integrating unit 4020 and thus forms the index image, when it is considered that the series of operations completes. Numeral 4040 denotes an index storage unit which stores index image information generated by the key frame selection unit 4030.

An operation of the image processing apparatus having the above structure according to the first embodiment will be explained hereinafter.

Figure 5:
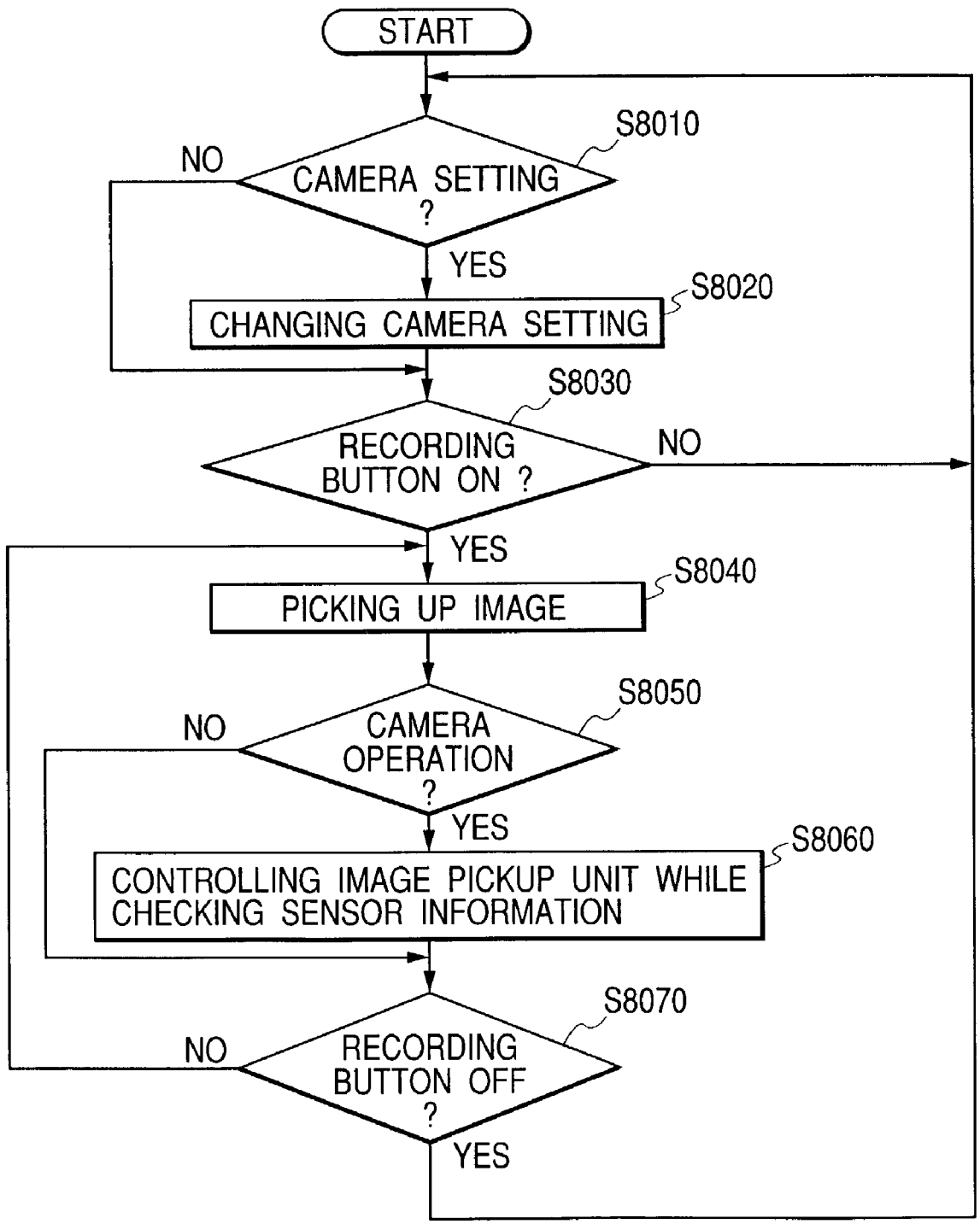
FIG. 5 is a flow chart showing the flow of a processing procedure in the photographing unit according to the first embodiment.

FIG. 5 is a flow chart showing a processing procedure in the photographing unit 1010 according to the first embodiment. First, in step S8010, it is discriminated whether or not setting of the camera is performed by the user through the camera operation unit 2030. Here, the setting of the camera includes, e.g., a focus mode (auto/manual), an exposure mode (auto, gain preference, shutter speed preference, diaphragm preference, manual), a white balance mode (auto, hold, one push, preset), and the like.

If the setting of the camera is performed, then the control unit 2050 changes the setting of the image pickup unit 2010 in step S8020, and sends the information representing the changed setting to the recording unit 2060 as the camera operation information. Next, it is discriminated in step S8030 whether or not a recording button is turned on. If the recording button is not turned on, the apparatus is in a standby state, whereby the flow returns to step S8010.

On the other hand, when the recording button is turned on, the control unit 2050 sets a recording state, and sends a recording start time of this recording to the recording unit 2060 as the camera operation information. Next, in step S8040, the recording by the recording unit 2060 is started because the apparatus came to be in the recording state. Thus, the image picked up by the image pickup unit 2010 is compressed by the image compression unit 2020 and then sent to the recording unit 2060 as the video data.

Next, it is checked in step S8050 whether or not the camera operation is performed by the user. Here, the camera operation includes, e.g., ON/OFF of a zoom button, pan, tilt and the like. Then, in step S8060, the control unit 2050 controls the image pickup unit 2010 and the like on the basis of the information sent from the sensor unit 2040.

Here, the sensor information includes information representing, e.g., a focal length, a focusing length, detected unintentional movement of the hands, and the like. Then, for example, when a zoom operation is performed, the image is zoomed in/out by moving the lens of the image pickup unit 2010 only for the interval while the zoom button is being depressed, and then focused on the basis of the sensor information such as the focal length, the focusing length and the like. At this time, the sensor information such as the ON/OFF of the zoom button, the focal length, the focusing length and the like is sent to the recording unit 2060 as the camera operation information. Then, in the recording unit 2060, the video data sent from the image compression unit 2020 and the camera operation information are multiplexed with each other and recorded in the storage medium 2070.

As the method of multiplexing the data, the method standardized in an MPEG-2 system is used. In the present embodiment, the camera operation information is converted into a PES (Packetized Elementary Stream) packet and then multiplexed with a PES packet of the video data to generate a series of data strings such as TS (Transport Stream), PS (Program Stream) or the like and then record the generated data. Here, the recording unit 2060 generates the corresponding camera operation information for each frame of the image data, and multiplexes the generated camera operation information with the image data as the PES packet separate from the image data. Next, it is checked in step S8070 whether or not the recording button is OFF. When the recording button is not OFF, the flow returns to step S8040, and the apparatus is still in the photographing state. On the other hand, when the recording button is OFF, the flow returns to step S8010, and the apparatus comes to be in the standby state.

As above, the camera information in the present embodiment consists of the information obtained from the camera operation unit 2030 and the information obtained from the sensor unit 2040. Here, as the system of describing the camera operation information, for example, the system of DV format shown in FIG. 6, the system shown in FIG. 7 or the like can be used.

Figure 8:
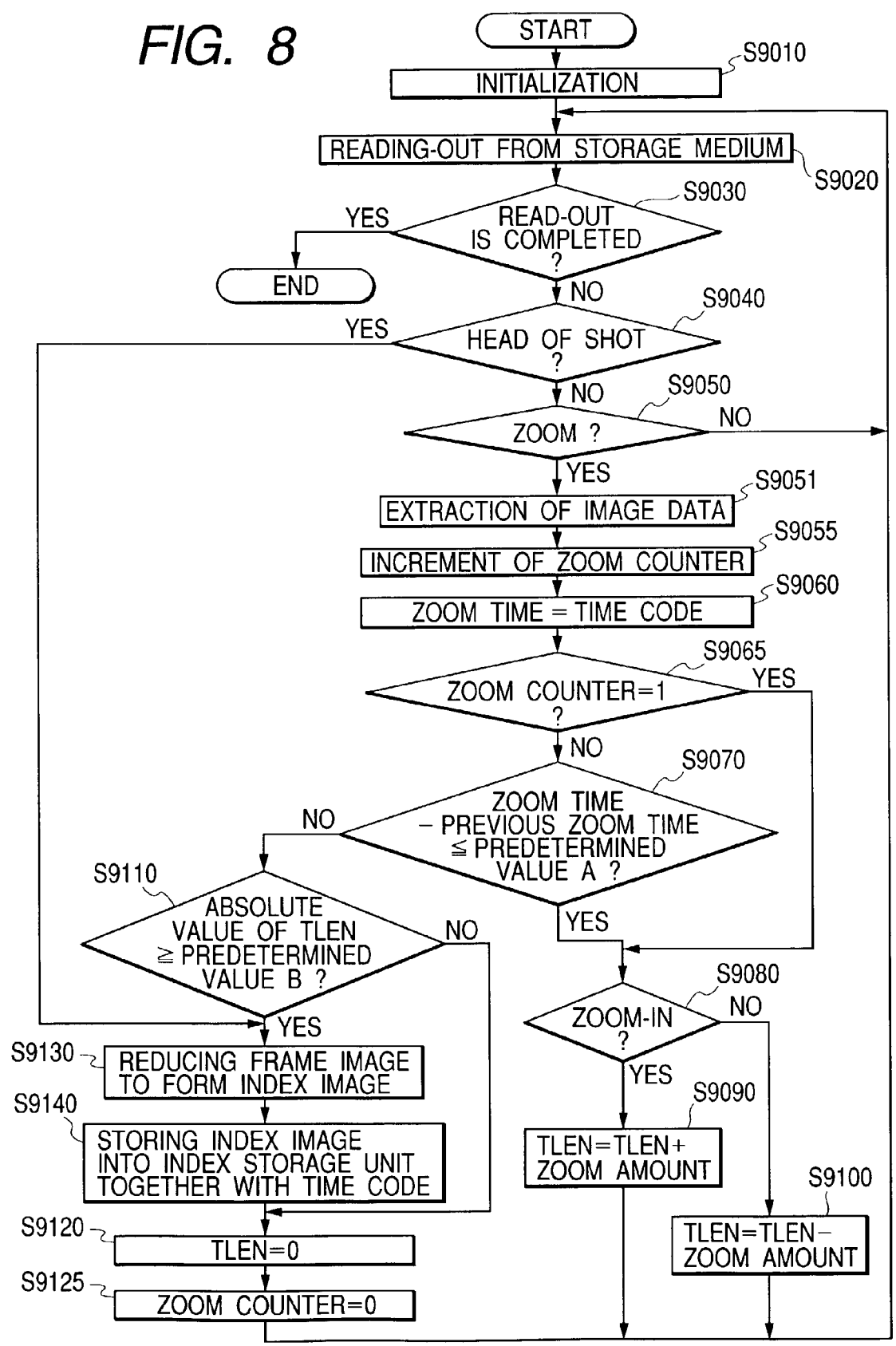
FIG. 8 is a flow chart showing the flow of a processing procedure in the indexing unit according to the first embodiment.

FIG. 8 is a flow chart showing a processing procedure in the indexing unit 1030 according to the first embodiment. Here, it should be noted that, although only the zoom is referred to, as camera operation information, this is only to simplify the explanation, and the same processing procedure is applicable to other camera operation information.

First, in step S9010, later-described variables such as a zoom time, TLEN, the value of a zoom counter and the like are initialized.

Next, in step S9020, the image data string is read from the storage medium 4010, and then it is discriminated in step S9030 whether or not the read-out operation of the image data is completed. If the read-out operation of the image data is completed, then the process is completed, while if the read-out operation of the image data is not completed, the flow advances to step S9040 to discriminate whether or not the read-out image data corresponds to the head of the shot. This can be discriminated according to whether or not a recording start time exists. That is, if the recording start time exists in the frame, this frame can be discriminated as the frame in which the recording button is turned on.

Incidentally, if the read-out image data corresponds to the head of the shot, then the index image is formed. Thus, in step S9130, the size of the image data of this headmost one frame is reduced to form the index image. Next, in step S9140, the obtained index image data and a time code of the image data of this one frame are stored as the index information in the index storage unit 4040.

Figures 9, 10:
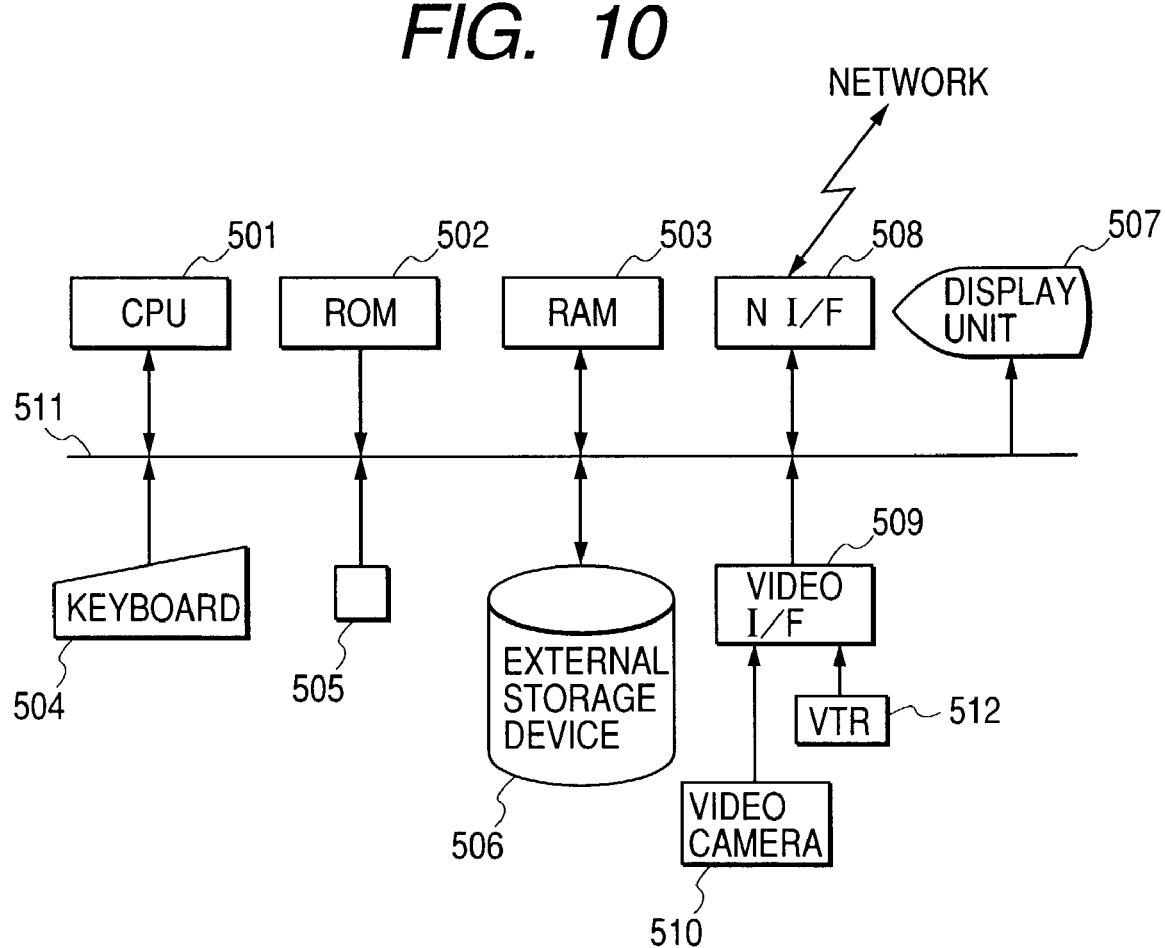
FIG. 9 is a diagram showing an example of index information.
FIG. 10 is a block diagram showing the control structure of an image processing apparatus for a moving image according to the second embodiment.

FIG. 9 shows an example of the index information stored in the index storage unit 4040. Here, a shot ID represents an ID given for each shot (from turn-on of a recording button to turn-off thereof recording button) in due order. Next, the variable TLEN is initialized to 0 in step S9120, and then the value of the zoom counter is initialized to 0 in step S9125. The flow then returns to step S9020.

On the other hand, if it is discriminated in step S9040 that the read-out image data does not correspond to the head of the shot, the flow advances to step S9050 to discriminate whether or not the camera operation information representing the zoom operation is added to the image data of the frame currently reproduced. If the camera operation information representing the zoom operation does not exist, the flow returns to step S9020, while if the camera operation information representing the zoom operation is added, the flow advances to step S9051. In step S9051, the image data of the one frame corresponding to the camera operation information representing the zoom operation detected here is extracted and stored in a memory (not shown) provided in the apparatus. Besides, also the image data of the one frame corresponding to the camera operation information in a case of previously detecting the zoom operation is stored in this memory, and, every time the zoom operation is detected, the image data of the one frame corresponding to the detected camera operation information is written alternately into storage areas of two frames prepared on the memory.

Next, in step S9055, the zoom counter is incremented. As described above, since the ordinary user is inexperienced in the camera operation, there is a case where the zoom operations (zoom in and zoom out) are repeated several times to obtain a desired zoomed-in image. The value of the zoom counter is the variable provided to count the number of such the zoom operations.

Next, in step S9060, the time code of the extracted image data of the one frame is stored as the zoom time. In the present embodiment, the zoom time detected here and the zoom time detected immediately before are stored in a not-shown memory, and, every time the zoom time is newly detected, the newly detected zoom time is overwritten on the earlier detected zoom time information, so as always to preserve information about the two most recent zoom operations.

Next, it is discriminated in step S9065 whether or not the value of the zoom counter is one. If the value of the zoom counter is one (i.e., in case of the first-time zoom operation), the flow advances to steps S9080 to S9100 to calculate the variable TLEN.

Next, in step S9070, a difference between the zoom time detected now and the zoom time detected one-time before is obtained, and it is further discriminated whether or not the obtained difference is equal to or smaller than a predetermined value A. Here, the value A is the value as follows. As described above, since the ordinary user is inexperienced in the camera operation, he frequently repeats the zoom operations (zoom in and zoom out) until he obtains the desired zoomed-in image.

This series of zoom operations occurs at short intervals and is completed if the desired zoomed-in image is obtained. The value A represents the upper limit of the interval between the successive two zoom operations which can be considered to be repeated as above. The value A can be obtained from experience and, although it is not limited to this, is a short time about one second or so. In any case, if it is discriminated in step S9070 that the time interval between the successive two zoom operations is equal to or smaller than the predetermined value A, since the apparatus is in the state that the zoom operations are repeated, the processes from steps S9080 to S9100 are performed.

In step S9080, it is discriminated whether or not the camera operation information represents the zoom-in operation. If the camera operation information represents the zoom-in operation, the flow advances to step S9090 to add a zoom amount to the variable TLEN. Here, the variable TLEN represents a substantial zoom-in amount in the series of the zoom operations, and the zoom amount is the amount of the period of the zoom operation and can be represented by the number of frames or the time period which are weighted by zoom intensity (a rate of change of a zoom magnification, or movement speed of a zoom lens).

If the camera operation information represents the zoom-out operation, the zoom amount is subtracted from the variable TLEN in step S9100, because the variable TLEN represents the substantial zoom-in amount. After the variable TLEN was calculated, the flow returns to step S9020.

If it is discriminated in step S9070 that the time interval is larger than the predetermined value A, this represents the case where the series of the zoom operations is completed. At this time, the flow advances to step S9110. Then, it is discriminated in step S9110 whether or not the absolute value of the variable TLEN representing the substantial zoom-in or zoom-out amount is equal to or larger than a predetermined value B. If this absolute value is extremely small, this represents that the zoom operation is hardly performed before and after the series of the zoom operations. That is, this corresponds to a case where the user finally stops performing the zoom operation. Therefore, the predetermined value B represents the lower-limit value of the amount which can be recognized to have been zoomed. Here, the value B can be obtained from experience and is not specifically limited to such the value.

If the absolute value of the variable TLEN is smaller than the predetermined value B, since it is unnecessary to form the index at such a position, steps S9130 and S9140 are skipped. On the other hand, if this absolute value is equal to or larger than the predetermined value B, it is recognized that the zoom operation was performed. At this time, one other image data, i.e., the image data extracted when the zoom operation was detected last time, which is stored in the memory together with the image data stored in step S9051 is the last image data in the series of the zoom operations, and the obtained image is the zoomed-in image which is appropriate as the index. Thus, the flow advances to step S9130 to reduce this image data and generate the index image data.

Then, in step S9140, the time code of that time and the index image data are stored in the index storage unit 4040 as the index information. Next, the variable TLEN is initialized to 0 in step S9120, and also the value of the zoom counter is initialized to 0 in step S9125. Then, the flow returns to step S9020.

As explained above, in the present embodiment, in the case where the interval between the time of the zoom operation detected this time and the time of the zoom operation detected last time is equal to or larger than the predetermined value, the frame, stored in the memory, at the time of the zoom operation performed immediately before is extracted as the index, whereby the frame at the time of the end of the series of the zoom operations can be extracted as the index.

Therefore, even if the user being inexperienced in the camera operation repeats the zoom operations, the index appropriately representing the contents of the shot can be obtained.

Moreover, in the present embodiment, the operation amounts during the series of the zoom operations are accumulated, and the index is extracted only when the accumulated value of the operation amounts is equal to or larger than the predetermined value at the time of the end of the series of the zoom operations. Thus, even if the zoom-in and zoom-out operations are repeated in a series of zoom operations, the index representative of the shot intended by the user can be obtained without extracting useless indexes.

FIG. 10 is a block diagram showing the control structure of an image processing apparatus according to the second embodiment.

In FIG. 10, numeral 501 denotes a CPU which executes various control in the present embodiment, numeral 502 denotes a ROM which stores boot programs to be executed when the image processing apparatus starts and various data, and numeral 503 denotes a RAM which stores control programs for the process of the CPU 501 and also provides a working area when the CPU 501 executes the various control. Numerals 504 and 505 respectively denote a keyboard and a mouse which present various input operation circumstances by a user.

Numeral 506 denotes an external storage device which is composed of a hard disk, a flexible disk, a CD-ROM and the like, numeral 507 denotes a display unit which is composed of display and the like and displays operation results and the like to the user, numeral 508 denotes a network interface which enables communication with various devices on a network, numeral 509 denotes a video interface which enables capture of image data from a video camera 510 and a VTR 512, and numeral 511 denotes a bus which connects these devices with others. Here, in the above structure, the video camera 510, the VTR 512 and the external storage device 506 can be disposed on the network.

Figure 11:
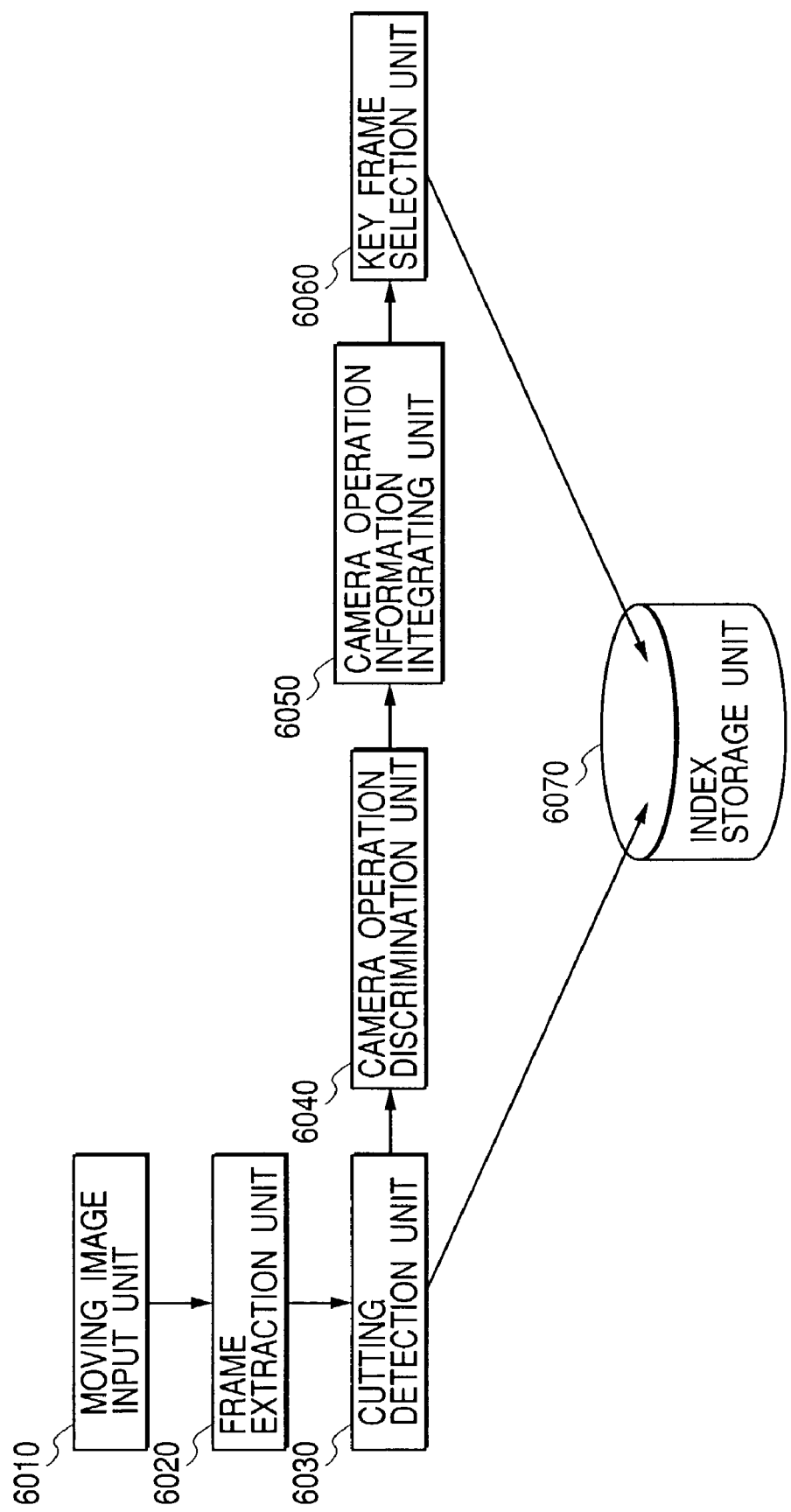
FIG. 11 is a block diagram showing the functional structure of the image processing apparatus for the moving image according to the second embodiment.

FIG. 11 is a block diagram showing the functional structure of the image processing apparatus according to the second embodiment.

In FIG. 11, numeral 6010 denotes a moving image input unit which inputs moving image data output from the video camera 510 and the VTR 512 through the video interface 509, and reads and inputs the moving image data from the external storage device 506, the storage medium 4010 shown in FIG. 4, and the like. Numeral 6020 denotes a frame extraction unit which extracts, in due order, frames (images) constituting the moving image.

Numeral 6030 denotes a cutting detection unit which detects a cutting point in the moving image, and numeral 6040 denotes a camera operation discrimination unit which discriminates camera operation information based on an image process. Numeral 6050 denotes a camera operation information integrating unit which integrates the camera operation information discriminated by the camera operation discrimination unit 6040, on the basis of time information and the like. That is, with respect to the camera operation information representing the same operation contents and being temporarily adjacent to each other, the camera operation information integrating unit 6050 calculates the accumulated value of the operation amounts represented by the camera operation information. Numeral 6060 denotes a key frame selection unit which selects as a key frame a frame satisfying a predetermined condition on the basis of the camera operation information integrated by the camera operation information integrating unit 6050 and forms an index image when it is considered that the series of the operations is completed, and numeral 6070 denotes an index storage unit which stores the index information generated through the cutting detection unit 6030 and the key frame selection unit 6060.

An example of the operation of the image processing apparatus according to the second embodiment having the structure as above will be explained hereinafter.

Figure 12:
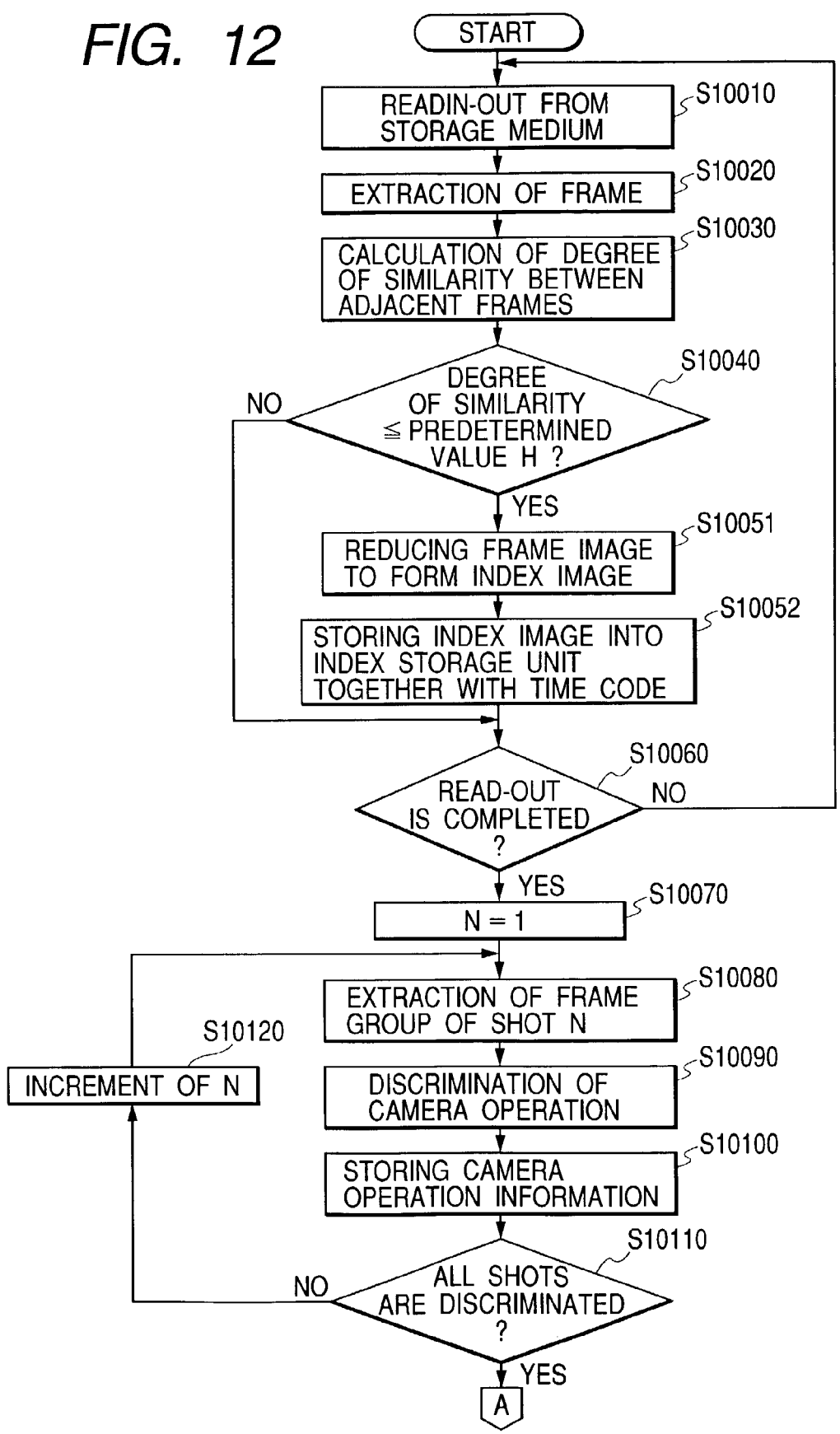
FIG. 12 is a flow chart showing a processing procedure in the image processing apparatus for the moving image according to the second embodiment.
Figure 13:
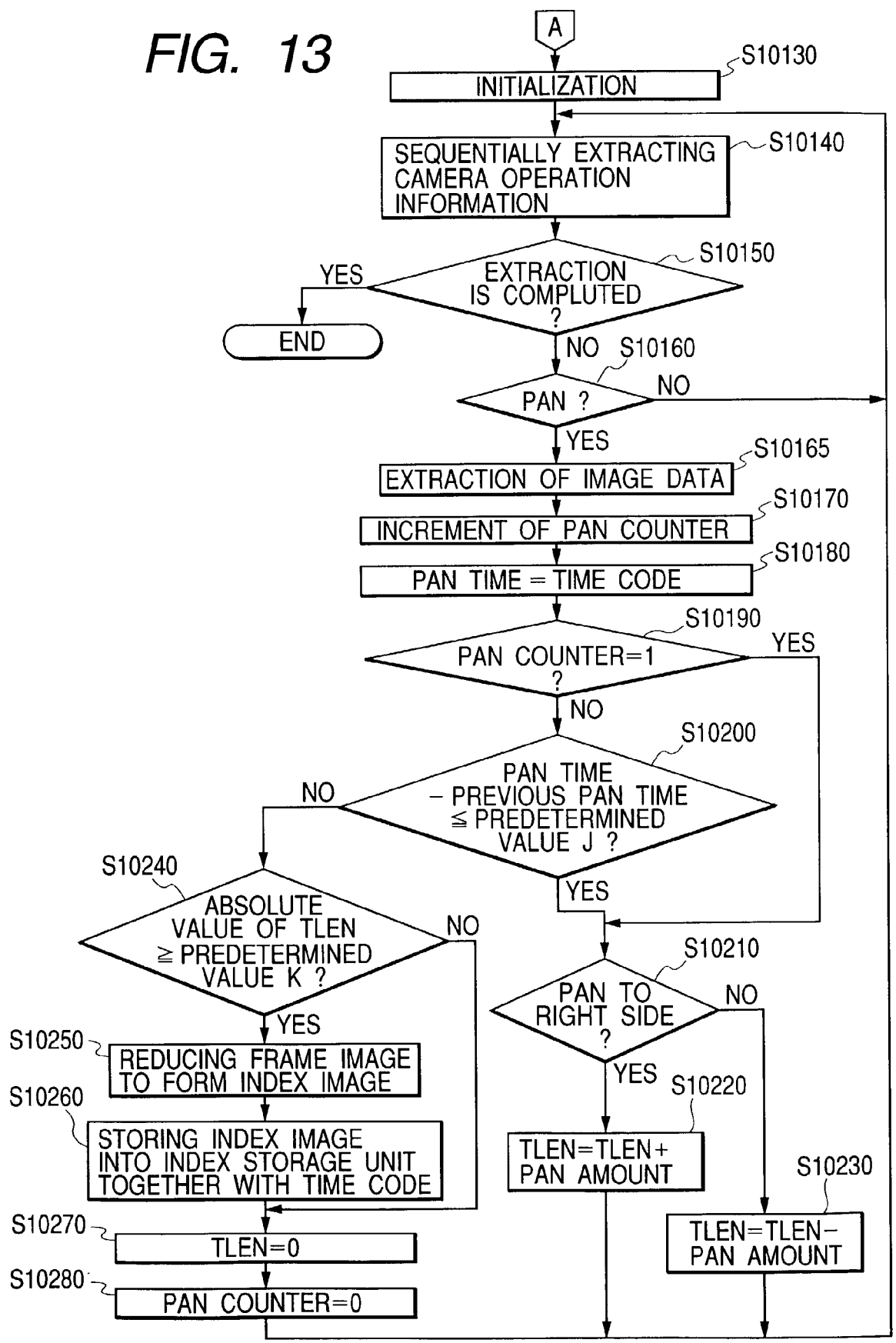
FIG. 13 is a flow chart showing the processing procedure in the image processing apparatus for the moving image according to the second embodiment.

FIGS. 12 and 13 are flow charts showing a procedure in the image processing apparatus according to the second embodiment.

First, in step S10010, the moving image input unit 6010 reads the moving image data from the storage medium 4010. Although the moving image input unit 6010 can input the moving image data from, in addition to the storage medium 4010, the video camera 510 and the VTR 512 through the video interface 509 as described above, the case where the moving image data is read out from the storage medium 4010 will be explained in the present embodiment. Incidentally, unlike the first embodiment, it is assumed that any camera operation information is not recorded but only the moving image data is stored in the storage medium 4010.

Next, in step S10020, the frame extraction unit 6020 sequentially extracts the frames and sends them to the cutting detection unit 6030. Then, in step S10030, the cutting detection unit 6030 calculates a degree of similarity between the adjacent frames.

Figure 14:
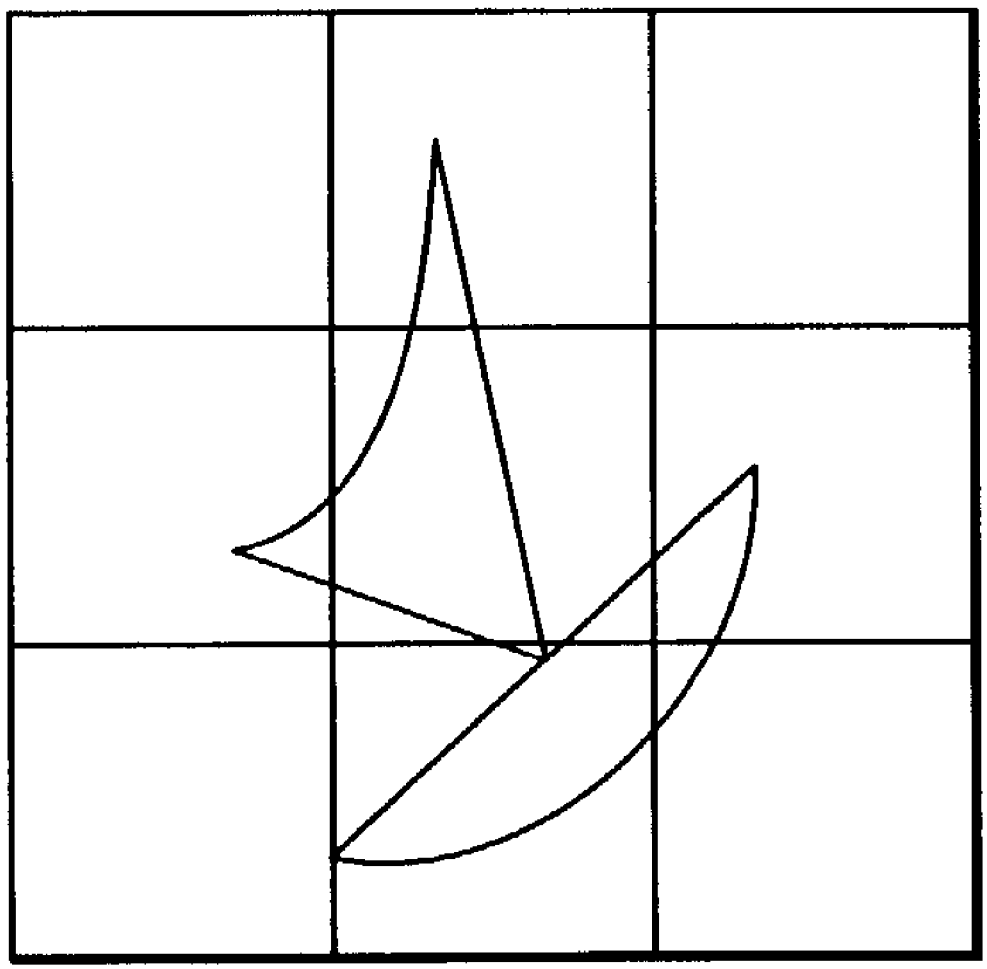
FIG. 14 is a diagram for explaining an example of inter-frame similarity length calculation.

Here, as the degree of similarity between the adjacent frames, an inter-frame similarity length is calculated and represented by percentage on the assumption that the degree of similarity for being completely identical is represented with 100%. It should be noted that an algorithm to calculate the inter-frame similarity length is not specifically limited to this. To cite a very simple example, each frame to be compared is divided into plural blocks longitudinal and lateral directions as shown in FIG. 14, the average values of RGB components are calculated beforehand for each block, and the sum of the squares of differences of respective RGB channels between the corresponding blocks to be compared is obtained as the inter-frame similarity length. The smaller this value is, the greater the degree of similarity is. On the other hand, the larger this value is, the smaller the degree of similarity is, that is, there is a large possibility that this value represents the cutting point. An example of an expression for calculating the inter-frame similarity length is shown by the following expression (1):

$$\sum_{i=1}^{k}\{(P1_{iR} - P2_{iR})^2 + (P1_{iG} - P2_{iG})^2 + (P1_{iB} - P2_{iB})^2\} \quad (1)$$

where i represents a block now being processed, $P1_{iR}$ represents the average value in the R channel of the i-th block in the frame immediately before, $P1_{iG}$ represents the average value in the G channel of the i-th block in the frame immediately before, $P1_{iB}$ represents the average value in the B channel of the i-th block in the frame immediately before, $P2_{iR}$ represents the average value in the R channel of the i-th block in the current frame, $P2_{iG}$ represents the average value in the G channel of the i-th block in the current frame, and $P2_{iB}$ represents the average value in the B channel of the i-th block in the current frame.

Next, it is discriminated in step S10040 whether or not the degree of similarity is equal to or smaller than a predetermined value H. Since the image abruptly changes at a transition (cutting point), the degree of similarity is lower between the frames before and after the transition. That is, the predetermined value H is the lower-limit value of the degree of similarity which is not considered as a cutting point. The value H can be obtained from experience and, although not specifically limited to this value, is preferably 80% or so.

Then, if the degree of similarity is smaller than the predetermined value H, this indicates the cutting point. Thus, to adopt this image as the index, in step S10051, the image data of one frame of which the degree of similarity is low is extracted, and the size of the extracted image data is reduced to form the index image. Next, in step S10052, a shot ID is added to the time code of that time and the index image data, and the obtained data is then stored as the index information in the index storage unit 6070. Here, it should be noted that the shot ID is the ID to be added for each shot. FIG. 9 shows the example of the index information stored in the index storage unit 6070.

On the other hand, if it is discriminated in the step S10040 that the degree of similarity is larger than the predetermined value H, this does not indicate the cutting point, and so steps S10051 and S10052 are skipped. Next, it is discriminated in step S10060 whether or not the read-out operation is completed, and if not completed, the processes from steps S10010 to S10050 are repeated. The processing described above is the detection of the cutting point.

By the process up to here, the index image data can be generated from the image data of the headmost one frame of each cut.

Next, in step S10070, one is set as an initial value of N, and then, in step S10080, a group of the frames corresponding to the shot N is extracted. Then, in step S10090, the camera operation discrimination unit 6040 discriminates the camera operation. Here, although a detailed explanation of a concrete discrimination process of the camera operation using the image data will be omitted, for example, there is a method of obtaining vanishing point of a moving vector using the Hough transformation, setting from among the plural vanishing points the vanishing point which obtained the maximum number of votes, as the vanishing point to the background, and solving the constraint expression concerning the camera operation information.

If the camera operation information is discriminated, in step S10100, the camera operation information corresponding to each frame of the image data is temporarily stored in a not-shown memory in such formats as shown in FIGS. 6 and 7 described in the first embodiment. Next, in step S10110, end discrimination is performed, and if the shot to be processed still remains, the flow advances to step S10120 to increment the shot N, and then the processes from steps S10080 to S10100 are repeated. This process is the process of the camera operation discrimination.

Next, a camera operation information integrating process and a key frame selection process are performed.

Here, it should be noted that, to simplify the explanation, only the pan is adopted as the camera operation information.

However, the same processing procedure is applicable to other camera operation information.

In step S10130, later-described variables such as a pan time, TLEN, the value of a pan counter and the like are initialized. Next, the camera operation information discriminated by the camera operation discrimination unit 6040 is sequentially extracted in step S10140, and then it is discriminated in step S10150 whether or not the extraction of the information is completed. If the extraction is completed, the process is completed as a whole. On the other hand, if the extraction is not completed, the flow advances to step S10160.

Then, it is discriminated in step S10160 whether or not the pan exists as the camera operation information. If the pan does not exist, the flow returns to step S10140, while if the pan exists, the flow advances to step S10165. In step S10165, the image data of one frame corresponding to the camera operation information in which the pan operation is detected is extracted, and the extracted image data is stored in a memory (not shown). Here, since the image data of one frame corresponding to the camera operation information in which the pan operation had been detected last time has already been stored in this memory, the image data of one frame corresponding to the detected pan operation are written alternately on the areas of the two frames in the memory every time the pan operation is detected.

Next, in step S10170, the pan counter is incremented. As described above, since the ordinary user is inexperienced in the camera operation, it is necessary for him to repeat the pan operations (rightward and leftward) several times to obtain a desired image. The pan counter represents the variable for counting the number of the pan operations.

Next, in step S10180, the time code of the frame in which the pan operation is detected is stored as the pan time. Then, the detected pan information is stored in the memory (not shown) together with the time information of the pan operation detected immediately before, and the time information of the pan operation is overwritten every time the pan operation is newly detected. Next, it is discriminated in step S10190 whether or not the pan counter is one. If the pan counter is one (i.e., the first pan), the flow advances to steps S10210, S10220 and S10230 to calculate the variable TLEN.

In step S10200, the difference between the pan time detected just now and the pan time detected immediately before is obtained, and it is discriminated whether or not the obtained difference is equal to or smaller than a predetermined value J. Here, the predetermined value J is the value as follows. Since the ordinary user is inexperienced in the camera operation, he frequently repeats the pan operations (rightward and leftward) several times to obtain the desired image.

The series of the pan operations at this time occurs at short intervals and is completed when the desired image is obtained. The predetermined value J represents the upper-limit value of the time interval between the successive pan operations. The value J can be obtained from experience and, although not specifically limited to such the value, is a short time of about one second or so.

Thus, if it is discriminated in step S10200 that the difference is equal to or smaller than the predetermined value J, this indicates the case where the pan operations are being repeated, whereby the processes from steps S10210 to S10230 are performed.

Then, in step S10210, it is discriminated based on the camera operation information whether or not the pan is the rightward pan. If the pan is the rightward pan, the flow advances to step S10220 to add the pan amount to the variable TLEN. Here, the variable TLEN represents the substantial amount of the rightward pan in the series of the pan operations, and the pan amount is the amount of the period during which the pan operation is performed and can be represented by the number of frames and the time period which are weighted by pan intensity (angular acceleration and the like).

On the other hand, if the pan is the leftward pan, the flow advances to step S10230 to subtract the pan amount from the variable TLEN. This is because the variable TLEN represents the substantial amount of the rightward pan.

After the variable TLEN has been calculated, the flow returns to step S10140. On the other hand, if it is discriminated in step S10200 that the difference between the pan time detected just now and the pan time detected immediately before is larger than the predetermined value J, this indicates the case where the series of the pan operations is completed. At this time, the flow advances to step S10240. Then, it is discriminated in step S10240 whether or not the absolute value of the variable TLEN is equal to or larger than a predetermined value K.

As described above, since the variable TLEN represents the substantial amount of the rightward pan, it becomes the substantial amount of the pan if the absolute value is removed. If this pan amount is extremely small, this indicates that the image does not finally change before and after the series of the pan operations and thus the pan operation is hardly performed. That is, this corresponds to a case where the user finally stops performing the pan operation. Thus, the predetermined value K represents the lower-limit value of the amount with which the pan can be recognized. The value K can be obtained from experience, and is not specifically limited to such the value.

If the absolute value of the variable TLEN is smaller than the predetermined value K, it is unnecessary to form the index at such a position, and so steps S10250 and S10260 are skipped. On the other hand, if this absolute value is equal to or larger than the predetermined value K, it is recognized that the pan operation is performed. At this time, one other body of image data, i.e., the image data extracted when the pan operation was detected last time, which is stored in the memory together with the image data stored in step S10165 is the last image data in the series of the pan operations, and the image based on this last image data is the image appropriate as the index. Thus, the flow advances to step S10250 to reduce this image data of one frame to form the index image.

Then, in step S10260, the time code of that time and the index image data are stored as the index information in the index storage unit 6070. Next, the variable TLEN is initialized to 0 in step S10270, and also the value of the pan counter is initialized to 0 in step S10280. Then, the flow returns to step S10140.

As explained above, in the present embodiment, even if the camera operation information at the time of the photographing is not recorded together with the moving image data, the state of the camera operation is discriminated from the image data, the discriminated camera operation information, e.g., pan information, is detected and compared with the information at the pan time detected last time, and the frame at the time of the zoom operation immediately before and having been stored in the memory is extracted as the index if the above compared result is equal to or larger than the predetermined value, whereby the frame at the time when the series of the camera operations is completed can be extracted as the index.

Therefore, even if the user, as a result of being inexperienced in the camera operation, repeats the camera operations, the index appropriately indicating the contents of the shot can be obtained.

Moreover, in the present embodiment, the operation amounts during the series of the camera operations are accumulated, and the index is extracted only when the accumulated value of the operation amounts is equal to or larger than the predetermined value at the time of the end of the series of the camera operations. Therefore, even if the rightward and leftward pan operations are repeated although the series of the camera operations is performed, the index representative of the shot intended by the user can be obtained without extracting useless indexes.

Although the time code is used to represent the frame position in the above embodiments, a frame ID may be used instead if it can specify the frame in the series of the moving data.

Although the photographing unit 1010 and the indexing unit 1030 both shown in FIG. 1 are respectively achieved by the separate devices in the first embodiment, these units can be achieved by a single device. Moreover, although the photographing unit 1010 and the indexing unit 1030 exchange the data through the recording medium 1020, it can be structured to exchange the data through a communication means such as IEEE1394 or the like.

Moreover, in the first embodiment, the procedure of the photographing unit 1010 shown in FIG. 5 is one example, that is, the procedure is not limited to this. For example, it is possible to change the setting of the camera while the image is being picked up. Moreover, in the above embodiments, in the process of forming the index from the camera operation information, although one kind of camera operation information is described, the same processing procedure is applicable to other camera operation information to form the index.

Moreover, although the index information is stored in the index storage unit (4040 or 6070) in the above embodiments, this information may be written on a predetermined area of the storage medium 4010 or output through the network. By doing so, the index information can be utilized in other devices.

Moreover, although the index information is stored in the format shown in FIG. 9 in the above embodiments, the format is not limited to this. For example, if a distinction for each shot is unnecessary, the shot ID can be omitted, or a period of the camera operation information (e.g., start and end points of the zoom operation) can be added. Incidentally, the frame after the series of the camera operations is adopted as the representative image in the above embodiments.

However, for example, there is a case where, when the pan operation is sufficiently long, it is easy for the user to understand the contents of the operation if the frame on the way of the operation is set as the representative image, and this frame is rather appropriate as the index. Therefore, for example, in the discrimination of step S10200 shown in FIG. 13, a process to discriminate whether or not the substantial amount of the pan is smaller than the predetermined value is provided after the operation of discriminating the series of the pan operations. Then, if the substantial amount is smaller than the predetermined value, the flow advances to steps S10250 to S10260 to form the index image, and then returns to step S10140 through steps S10270 and S10280. On the other hand, if the substantial amount is larger than the predetermined value, the flow may advance to step S10210. Here, as the predetermined value, the value by which the contents of the operation can be easily understood by the user may be obtained from experience.

Moreover, in the above embodiments, the reduced frame image is used as the representative image because of efficiency in displaying these images as a list. If such efficiency improvement may be sacrificed, the frame image itself may be used as the representative image. At this time, even if the image itself is not stored as the index information, the image of the corresponding frame may be sequentially read from the storage medium by referring to the time code.

Moreover, although the formats shown in FIGS. 6 and 7 are adopted as the format of the camera operation information in the above embodiments, the format is not limited to them, that is, any format may be used if it is described with a kind of camera operation information, existing periods, directions and intensity if necessary.

The present invention is applicable to a system composed of plural devices such as a host computer, an interface device, a reader, a printer and the like or to an apparatus including a single device (e.g., a copying machine, a fax machine or the like). Moreover, the object of the present invention can be achieved in a case where a storage medium storing program codes of software for realizing the functions of the above embodiments is supplied to a system or an apparatus and then a computer (or CPU or MPU) in the system or the apparatus reads and executes the program codes stored in the memory medium.

In this case, the program codes themselves read from the storage medium realize the functions of the above embodiments, and the storage medium storing these program codes constitutes the present invention. As the storage medium for supplying the program codes, for example, a flexible disk, a hard disk, an optical disk, a magnetooptical disk, a CD-ROM, a CD-R, a magnetic tape, a nonvolatile memory card, a ROM and the like can be used.

The present invention includes not only the case where the functions of the embodiments are realized by executing the program read by the computer, but also a case where an OS (operating system) or the like functioning on the computer executes a part or all of the actual process on the basis of instructions of the program codes, and the functions of the embodiments are realized by that process.

The present invention further includes a case where the program codes read from the storage medium are once stored in a memory provided in a function expansion board inserted in the computer or a function expansion unit connected to the computer, and then a CPU or the like provided in the function expansion board or the function expansion unit executes a part or all of the process on the basis of the instructions of these program codes, and the functions of the embodiments are realized by that process.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image processing apparatus comprising:
   obtaining means for obtaining moving image data picked up by image pickup means and operation information concerning an operation condition of said image pickup means at a time when the moving image data is picked up;
   detection means for detecting a predetermined operation on the basis of the operation information obtained by said obtaining means;

discrimination means for, in response to a detection of a new predetermined operation, discriminating that a time interval between the two successive predetermined operations one of which is the detected new predetermined operation and the other of which is the predetermined operation detected by said detection means immediately before the detected new predetermined operation, is longer than a predetermined period; and extraction means for extracting image data of one picture image from the moving image data corresponding to the operation information indicating the former-detected one of the two successive predetermined operations, on the basis of the discriminated result of said discrimination means.

2. An apparatus according to claim 1, wherein said extraction means includes a memory for storing the image data of two picture images respectively corresponding to the operation information representing said two predetermined operations.

3. An apparatus according to claim 1, further comprising accumulated value calculation means for accumulating an accumulated value of operation amounts concerning the predetermined operations on the basis of the operation information in a case where the time interval between the two successive predetermined operations is shorter than the predetermined period, wherein said extraction means further extracts the image data of the one picture image from the moving image data on the basis of the discriminated result of said discrimination means and the accumulated value calculated by said accumulated value calculation means.

4. An apparatus according to claim 3, wherein, in a case where it is discriminated by said discrimination means that the time interval is longer than the predetermined period and the accumulated value is equal to or larger than a predetermined value, said extraction means extracts the image data of the one picture image corresponding to the operation information representing the former detected one of the two predetermined operations.

5. An apparatus according to claim 3, wherein said accumulated value calculation means calculates the accumulated value of the operation amounts by adding the operation amount with respect to a predetermined direction and subtracting the operation amount with respect to the direction opposite to the predetermined direction.

6. An apparatus according to claim 3, wherein said accumulated value calculation means accumulates, as the operation amount, a time period weighted according to intensity of the predetermined operation.

7. An apparatus according to claim 1, wherein said obtaining means includes reproduction means for reproducing the moving image data and the operation information added to the moving image data, from a recording medium.

8. An apparatus according to claim 7, wherein the operation information is added for each frame of the moving image.

9. An apparatus according to claim 1, wherein a time code having a different value is added to each frame of the moving image data, and wherein said discrimination means performs the discrimination process by obtaining a difference between the two time codes corresponding to the operation information representing the two predetermined operations and comparing the obtained difference with the predetermined period.

10. An apparatus according to claim 1, wherein said obtaining means includes operation information generation means for generating the operation information by using the moving image data.

11. An apparatus according to claim 1, further comprising index generation means for generating index information concerning the moving image data by using the image data extracted by said extraction means.

12. An apparatus according to claim 11, wherein said index generation means reduces the size of the extracted image data, and generates the index information by using the reduced image data.

13. An apparatus according to claim 12, wherein said index generation means generates the index information by adding a time code of the extracted image data to the reduced image data.

14. An index generation system which comprises an image pickup apparatus for picking up moving image data and an image processing apparatus for generating index information concerning the moving image data picked up by said image pickup apparatus, wherein said image pickup apparatus generates operation information concerning an operation condition of said image pickup apparatus at a time when the moving image data is picked up, multiplexes the operation information and the moving image data, and stores the multiplexed data in a storage medium, and wherein said image processing apparatus comprises:
reproduction means for reproducing the moving image data and the operation information from the storage medium;

detection means for detecting a predetermined operation on the basis of the reproduced operation information;

discrimination means for, in response to a detection of a new predetermined operation, discriminating that a time interval between the two successive predetermined operations one of which is the detected new predetermined operation and the other of which is the predetermined operation detected by said detection means immediately before the detected new predetermined operation, is longer than a predetermined period; and extraction means for extracting image data of one picture from the moving image data corresponding to the operation information representing former detected one of the two successive predetermined operations, on the basis of the discriminated result of said discrimination means.

15. An image processing apparatus comprising:
obtaining means for obtaining moving image data picked up by image pickup means and operation information concerning an operation condition of said image pickup means at a time when the moving image data is picked up;

detection means for detecting a predetermined operation on the basis of the operation information obtained by said obtaining means;

discrimination means for discriminating that a time interval between the two successive predetermined operations detected by said detection means is longer than a predetermined period;

extraction means for extracting image data of one picture image from the moving image data on the basis of the discriminated result of said discrimination means; and accumulated value calculation means for accumulating an accumulated value of operation amounts concerning the predetermined operation on the basis of the operation information in a case where the time interval between the two successive predetermined operations is shorter than the predetermined period, wherein said extraction means further extracts the image data of the one picture image from the moving image data on the basis of the discriminated result of said discrimination means and the accumulated value calculated by said accumulated value calculation means.

16. An image processing apparatus comprising:

obtaining means for obtaining moving image data picked up by image pickup means and operation information concerning an operation condition of said image pickup means at a time when the moving image data is picked up;

detection means for detecting a predetermined operation on the basis of the operation information obtained by said obtaining means;

discrimination means for discriminating that a time interval between the two successive predetermined operations detected by said detection means is longer than a predetermined period; and extraction means for extracting image data of one picture image from the moving image data on the basis of the discriminated result of said discrimination means, wherein a time code having a different value is added to each frame of the moving image data, and wherein said discrimination means performs the discrimination process by obtaining a difference between the two time codes corresponding to the operation information representing the two successive predetermined operations and comparing the obtained difference with the predetermined period.

17. An image processing method comprising the steps of:

obtaining moving image data picked up with image pickup means and operation information concerning an operation condition of said image pickup means at a time when the moving image data is picked up;

detecting a predetermined operation on the basis of the operation information obtained in said obtaining step;

discriminating that a time interval between the two successive predetermined operations detected in said detecting step is longer than a predetermined period;

extracting image data of one picture image from the moving image data on the basis of the discriminated result of said discriminating step; and accumulating an accumulated value of operation amounts concerning the predetermined operation on the basis of the operation information in a case where the time interval between the two successive predetermined operations is shorter than the predetermined period, wherein said extraction step includes a step of further extracting the image data of the one picture image from the moving image data on the basis of the discriminated result of said discriminating step and the accumulated value calculated in said accumulated value calculation step.

18. An image processing method comprising the steps of:

obtaining moving image data picked up with image pickup means and operation information concerning an operation condition of the image pickup means at a time when the moving image data is picked up;

detecting a predetermined operation on the basis of the operation information obtained in said obtaining step;

discriminating that a time interval between the two successive predetermined operations detected in said detecting step is longer than a predetermined period; and extracting image data of one picture image from the moving image data on the basis of the discriminated result of said discriminating step, wherein a time code having a different value is added to each frame of the moving image data, and wherein said discrimination step includes performing the discrimination process by obtaining a difference between the two time codes corresponding to the operation information representing the two predetermined operations and comparing the obtained difference with the predetermined period.

* * * * *